United States Patent [19]

Nagai et al.

[11] Patent Number: 4,748,652
[45] Date of Patent: May 31, 1988

[54] CIRCUIT FOR DETECTING ABNORMALITY IN FEEDER

[75] Inventors: Yasuo Nagai, Maebashi; Kazuhiko Kawai, Takasaki, both of Japan

[73] Assignee: Hitachi, Ltd., Tokyo, Japan

[21] Appl. No.: 5,953

[22] Filed: Jan. 22, 1987

[30] Foreign Application Priority Data

Jan. 22, 1986 [JP] Japan .................. 61-10083

[51] Int. Cl.[4] .................. H04M 1/24; H04M 3/08
[52] U.S. Cl. ............................ 379/26; 379/27; 324/555 SS
[58] Field of Search .............. 379/27, 26, 32; 324/51; 375/10; 370/14

[56] References Cited

U.S. PATENT DOCUMENTS 4,385,336 5/1983 Takeshita et al. ............ 379/26
4,424,479 1/1984 Brown .......................... 379/26

Primary Examiner—Stafford D. Schreyer
Attorney, Agent, or Firm—Antonelli, Terry & Wands

[57] ABSTRACT

A detecting circuit for detecting electric abnormality of a pair of feeders is provided with resistors $R_A$ and $R_B$ converting the abnormality of the feeders into a change in voltage, transistors ($Q_8$, $Q_9$ and $Q_{10}$) supplying or interrupting a current $I_B$ in response to presence or absence of an abnormal state, transistors ($Q_5$, $Q_6$ and $Q_{17}$) drawing in or blocking a current $I_A$ in response to the abnormal state, a current subtraction element (I) conducting a subtraction of the currents $I_B$ and $I_A$ on an absolute value basis, a current addition element (II) conducting an addition of the currents $I_A$ and $I_B$, a current addition element (III) adding the output currents of the current subtraction element (I) and current addition element (II), and a voltage comparator (6) subjecting the output current of the current addition element (III) to current-voltage conversion and comparing a voltage thus obtained with a reference voltage so as to obtain an abnormality detection signal, which is used to interrupt the feeding of electricity to the paired feeders when an abnormality is detected.

14 Claims, 3 Drawing Sheets

CIRCUIT FOR DETECTING ABNORMALITY IN FEEDER

BACKGROUND OF THE INVENTION

The present invention relates in general to telephone circuits, and more particularly to a circuit for detecting grounding and short-circuiting in a subscriber line interface circuit employed in a private branch exchange (PBX) and the like.

Grounding refers to a state in which a battery lead-in wire (a −48V wire, hereinafter referred to as wire A) of two feeders (a battery lead-in wire A and a ground wire B) which connect a subscriber terminal (a telephone set) with a telephone exchange is short-circuited to ground due to a fault.

A "short-circuit" to a situation where a ground wire (hereinafter referred to as wire B) is connected to a power source (−48V) for some reason (disconnection of the wire A and consequent short-circuit thereof with a wire B for instance). In the case where these states take place, they must be detected to stop the supply of current to the telephone set.

Regarding the circuit for detecting grounding, a circuit has been described in the Japanese Patent Publication No. 186/1984, which circuit is characterized in that it is suitable circuit integration and enables the detection of a ground condition by use a technique of loop current detection. However, detailed examination of this circuit by the present inventor has made it clear that the occurrence of an abnormality can not be detected even by said disclosed loop current detection technique in at least two cases.

(1) A constant-resistance feeding system (adopted in Japan) and a constant-current feeding system (adopted in U.S.A. and other countries) are used as feeding systems from a telephone exchange to a telephone set. According to the aforesaid disclosed technique, a mode of operation is possible wherein a ground can not be detected in the constant-current feeding system.

(2) Simultaneous occurrence of the ground and the "short-circuit" conditions can not be detected, even when the sole occurrence of either of them can be detected.

The above-mentioned two problems are essential for understanding the effect of the present invention, and therefore they will be described in more detail hereunder with reference to the drawings.

(i) Definitions of the constant-resistance feeding system and the constant-current feeding system The constant-resistance feeding system is a system for feeding a current from a power source (−48V) having a constant internal impedance $R_E$, as shown in FIG. 4(a). In the figure, $R_L$ denotes the line impedance.

The constant-current feeding system is a system for feeding a constant current irrespective of the value of the line impedance $R_L$, as shown in FIG. 4 (b).

FIG. 5 (a) is a circuit diagram of a simplified circuit based on the circuit described in the foregoing Japanese Patent Publication No. 186/1984 and applied to a constant-current feeding system. In this diagram a comparator circuit 12 is provided for comparing the respective output signals of sense circuits 10 and 11. In this circuit, an imbalance occurring between the currents flowing through the wires A and B when a ground condition occurs is so utilized as to generate an abnormality detection signal when the difference between these currents reaches a prescribed value or above. In the constant-current feeding system, however, the currents flowing through sense resistors $R_S$ and $R_S'$ do not change and consequently no abnormality can be detected even when the wire A is "short-circuited" while busy, as shown in the figure.

(ii) Problem of simultaneous occurrence of "short-circuit" and ground conditions FIG. 5 (b) also shows a simplified version of the aforesaid described circuit. When the wire A is grounded and simultaneously the wire B is "short-circuited" as shown by dotted lines in this figure, abnormal currents $I_E$ and $I_E'$ flow through the sense resistors $R_S$ and $R_S'$ in the same way, the imbalance between the currents does not occur, and thus no abnormality can be detected.

SUMMARY OF THE INVENTION

One object of the present invention is to furnish a detecting circuit which detects accurately the abnormality of a pair of feeders for a telephone set.

The above and other objects of the present invention and the novel characteristic features thereof will be made apparent from the description in the present specification and the drawings appended thereto.

The following is a simple description of a summary of the typical items of the invention disclosed in the present invention.

As is shown in FIG. 6, a system of loop voltage detection is adopted. More specifically, the potential of the wire B and ground potential are compared by a comparator 13, while the potential of the wire A and the power source potential are compared by a comparator 13', and an abnormality detection signal is generated when any abnormality of potential appears at least in either of the cases.

Owing to the voltage detection system, an abnormality can be detected irrespective of whether the system of constant-current feeding or that of constant-resistance feeding is used.

Moreover, any of the "short-circuit", the ground and the simultaneous occurrence of the "short-circuit" and the grounding conditions can be detected, since three modes of abnormality, i.e., a mode of abnormality in the potential of the wire A, a mode of abnormality in the potential of the wire B and a mode of reversal in the potentials of the wires A and B, can be detected.

BRIEF DESCRIPTION OF THE DRAWINGS

FIG. 4 (b) is a circuit diagram showing the construction of a constant-current feeding system;

PREFERRED EMBODIMENTS OF THE INVENTION

Typical embodiments of this invention will be described hereunder with reference to the drawings. In each drawing, elements conducting the same circuit operations are denoted by the same numerals and marks.

Figure 3:
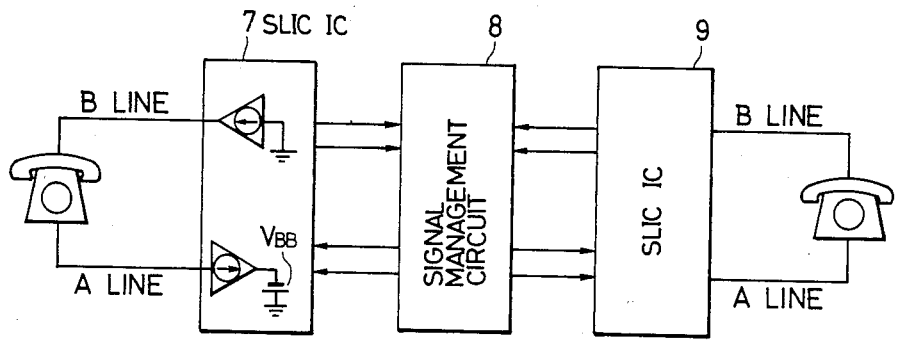
FIG. 3 is schematic block diagram of one example of a telephone communication system which is suitable for the application of the present invention.

FIG. 3 is an illustration of an actual example of a telephone communication system suitable for the application of the concepts of the present invention which will be described in these embodiments.

The detecting circuit of the present invention is incorporated in a subscriber line interface circuit (Subscriber Line Interface Circuit: hereinafter abbreviated as SLIC) IC.

The three main functions of this SLIC IC are summarized in the following:

(i) to supply a current to a telephone set;
(ii) to conduct two-four line conversion; and
(iii) to monitor the state of a subscriber line.

The present invention relates to the above-stated functions (i) and (iii), and the principal part relating to these functions in the IC will be pointed out and described below.

Figure 1:
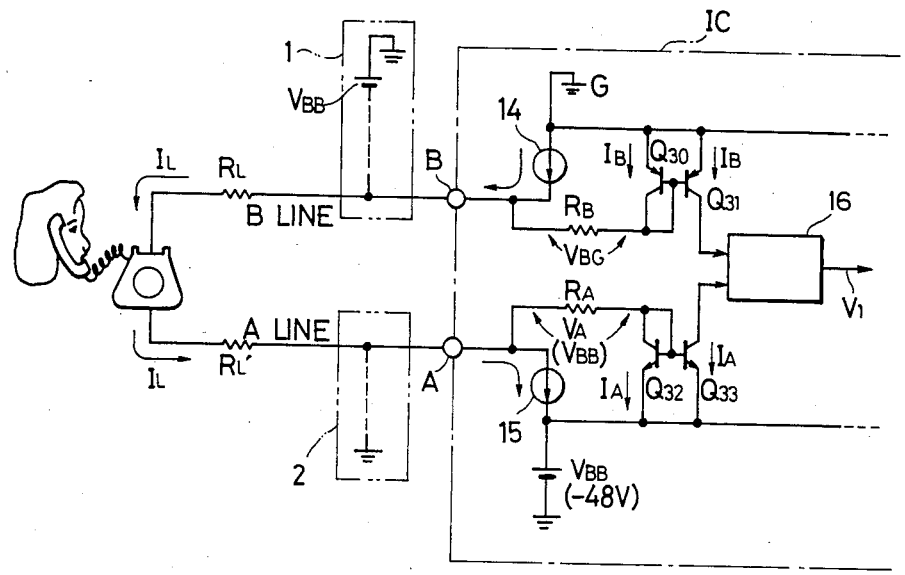
FIG. 1 is a schematic circuit diagram showing the principal part of a circuit for detecting occurrence of "short-circuit" and ground conditions, according to an embodiment of the present invention.

FIG. 1 shows the principal part of the embodiment of the present invention. While loop voltage detection is conducted in this embodiment as stated previously, it is difficult to detect a line voltage directly, since the potential of the subscriber line is high. Therefore, the potential $V_{BG}$ to ground of the wire B and the potential $V_A$ ($V_{BB}$) to the power source of the wire A are converted into respective currents by using voltage-current conversion resistors $R_B$ and $R_A$, respectively, and thereafter arithmetic operations are conducted to generate an abnormality detection signal $V_1$. Although it is not shown specifically in FIG. 1, this abnormality detection signal $V_1$ is fed back to constant-current sources 14 and 15 to turn off these sources.

This abnormality detection signal $V_1$ can be obtained at the same level with respect to the three modes of abnormality, i.e. grounding, "short-circuit" and the simultaneous occurrence of grounding and "short-circuit" (of which a description will be made later). A threshold voltage $V_{ref\ 1}$ for the determination of an abnormality can be varied linearly.

Figure 2:
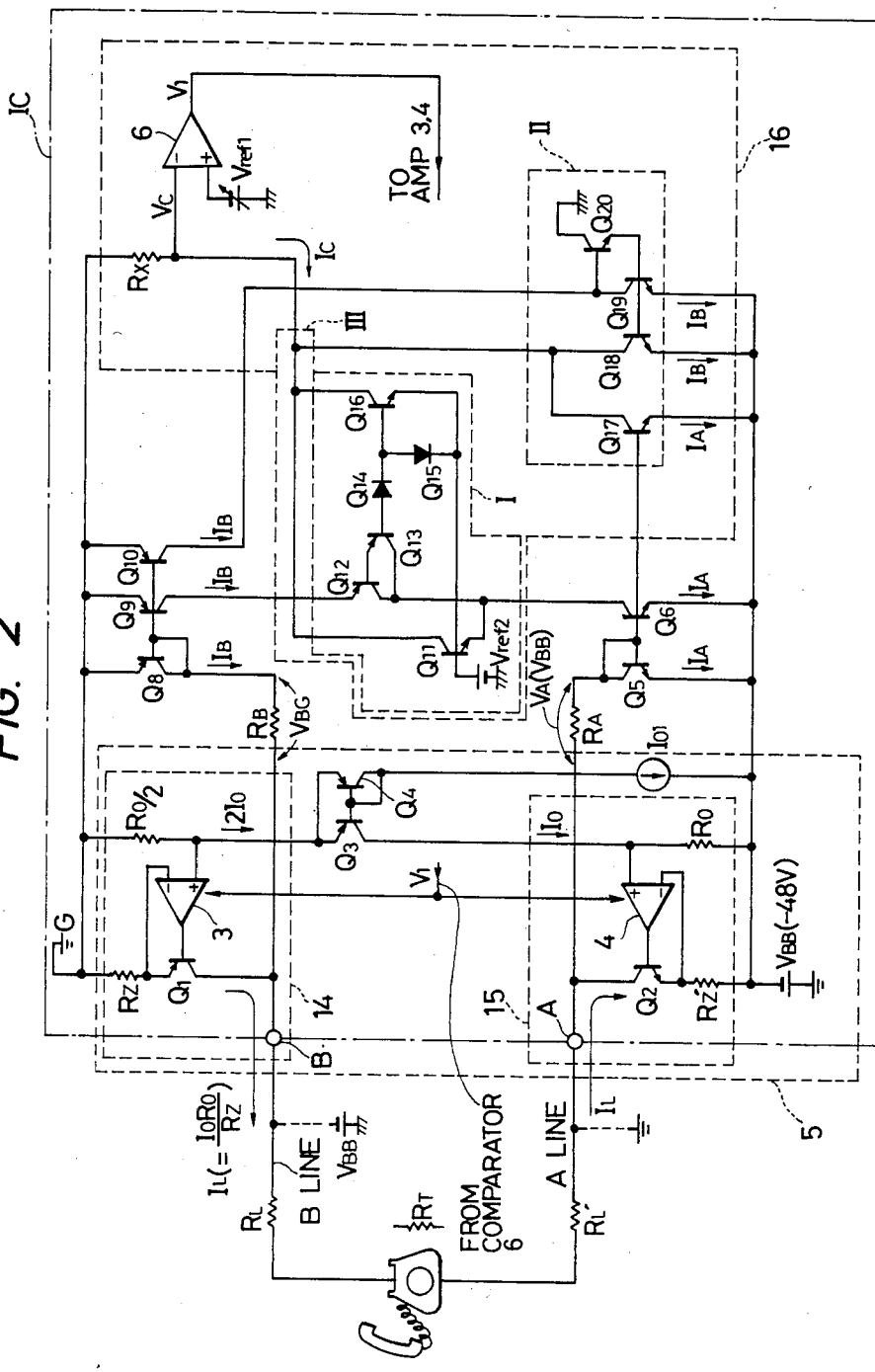
FIG. 2 is a schematic circuit diagram showing further details of the construction of the circuit for detecting the "short-circuit" and ground conditions shown in FIG. 1.
Figure 4A:
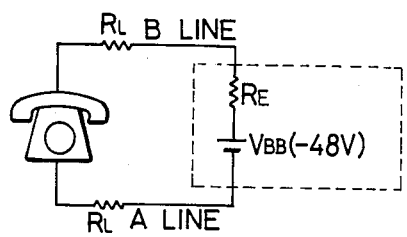
FIG. 4 (a) is a circuit diagram showing the construction of a constant-resistance feeding system.
Figure 4B:
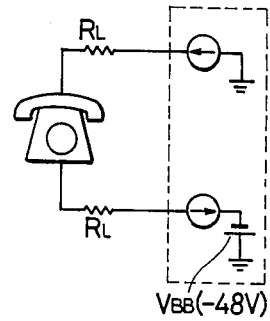
Figure 5A:
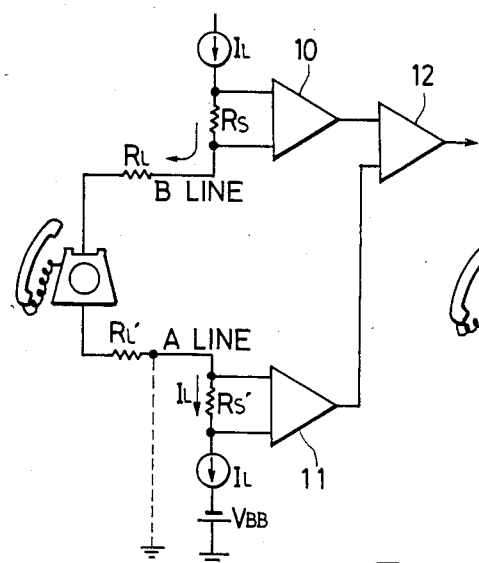
FIGS. 5 (a) and (b) are circuit diagrams for explaining the problems of a prior circuit.
Figure 5B:
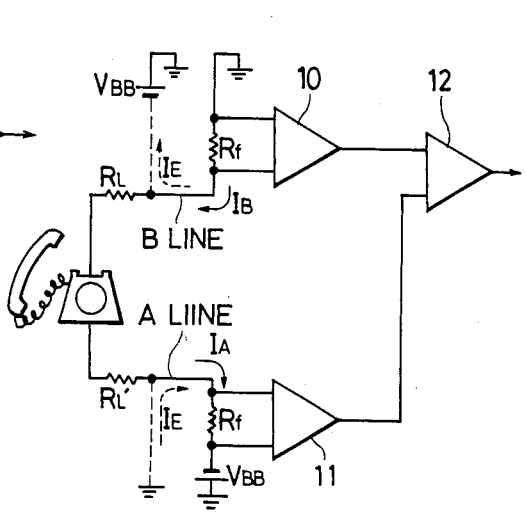
Figure 6:
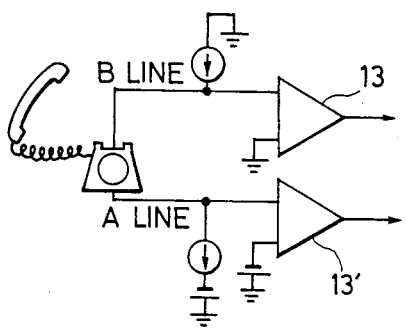
FIG. 6 is a circuit diagram for explaining the basic concept of the present invention.

FIG. 2 shows the circuit of FIG. 1 in more detail. In FIG. 2, a part 5 surrounded by a dotted line is a circuit block for supplying a constant current to a telephone set.

An arithmetic unit 16 is provided for detecting the above-mentioned three modes of abnormality which may be taking place in the feeders A and B and for generating the abnormality detection signal $V_1$. The arithmetic unit 16 comprises a current subtraction element I formed by using a current mirror, a current addition element II, a current addition element III composed of a wired OR, and a voltage comparator 6.

The aforesaid arithmetic unit 16 operates to generate the abnormality detection signal $V_1$, as will be described hereunder, when any mode of abnormality takes place.

(i) In the case of grounding of the wire A

Since the wire B is maintained at a normal grounding potential in this case, the emitter and collector of a transistor $Q_8$ are at substantially the same potential, and as a result, the transistor $Q_8$ turns off. Consequently, transistors $Q_9$ and $Q_{10}$ turn off as well. Accordingly, a current $I_B$ shown in FIG. 2 is not obtained, and a voltage drop $V_{BG}$ across a resistor $R_B$ does not occur either. Meanwhile, the voltage level at a point A rises higher than in normal operation due to the ground fault of the conductor A; a voltage drop $V_A$ occurs in a resistor $R_A$; and a current $I_A$ flows to a transistor $Q_5$.

Transistors $Q_5$, $Q_6$ and $Q_{17}$ are connected to the current mirror, and the transistor $Q_6$ operates in such a manner that it draws in the current $I_A$ through a resistor $R_X$ for detection, the current addition element III and the collector-emitter passage of transistor $Q_{11}$ of the current subtraction element I. Since the current $I_B$ supplied to a transistor $Q_{12}$ of the current subtraction element I is zero, the output current $I_A$ becomes $0-I_A=-|I_A|$.

Thus, the current subtraction element I executes a subtracting operation on an absolute value basis.

The transistor $Q_{17}$ of the current addition element II also operates in such a manner that it draws in the current $I_A$ through the resistor $R_X$ and the current addition element III. Accordingly, the output current $I_C$ of the current addition element III, in other words, the current flowing through the resistor $R_X$, becomes $2I_A$, and thus a voltage $V_C$ determined by $2I_A \cdot R_X$ is impressed on an inverted-input terminal of the voltage comparator 6. The voltage comparator 6 compares this voltage with a level-adjustable reference voltage $V_{ref\ 1}$ and generates the abnormality detection signal $V_1$.

Since the abnormality detection signal $V_1$ turns off the negative-feedback amplifiers 3 and 4 constituting the constant-current sources 14 and 15, respectively, transistors $Q_1$ and $Q_2$ are turned off, and consequently, a current $I_L$ supplied to the feeding lines A and B is interrupted.

(ii) In the case of a "short-circuit" condition of the wire B

Since the wire A is maintained at a normal battery potential ($V_{BB}$) in this case, no current flows to the resistor $R_A$, the transistor $Q_5$ turns off, and the transistors $Q_6$ and $Q_{17}$ turn off as well. Therefore the transistors $Q_6$ and $Q_{17}$ do not draw in the current $I_A$.

Meanwhile, the voltage drop $V_{BG}$ occurs across the resistor $R_B$ owing to the "short-circuit" of the wire B, and thus the transistor $Q_8$ is turned on to allow the current $I_B$ to flow. Transistors $Q_8$, $Q_9$ and $Q_{10}$ are connected to the current mirror, and the transistor $Q_9$ supplies the current $I_B$ to the current subtraction element I, while the transistor $Q_{10}$ supplies the current $I_B$ to the current addition element II.

Although the current $I_B$ is supplied to the transistor $Q_{12}$ of the current subtraction element I, the current flowing to the collectors of the transistors $Q_{12}$ and $Q_{13}$ becomes substantially zero since the transistor $Q_6$ is off. Accordingly, the transistors $Q_{12}$ and $Q_{13}$ are put in a saturated state, and thus the current $I_B$ supplied to the emitter of the transistor $Q_{12}$ flows to a bias power source $V_{ref\ 2}$ through the respective emitter-base junction of the transistors $Q_{12}$ and $Q_{13}$ and diodes $Q_{14}$ and $Q_{15}$.

The diode $Q_{15}$ and a transistor $Q_{16}$ constitute a current mirror, and the current $I_B$ flowing through the diode $Q_{15}$ makes the transistor $Q_{16}$ operate so that it draws in the current $I_B$ through the resistor $R_X$ and the current addition element II. Since the current $I_A$ is zero in this case, the current $I_B$ becomes $I_B-0=I_B$. Thus, the current subtraction element I executes a subtracting operation.

Meanwhile, the current $I_B$ obtained from the transistor $Q_{10}$ becomes an input current to a current mirror formed of transistors $Q_{18}$, $Q_{19}$ and $Q_{20}$ of the current addition element II, and therefore the output transistor $Q_{18}$ of this current mirror operates in such a manner that it draws in the current $I_B$ through the resistor $R_X$ and the current addition element III. Accordingly, the output current $I_C$ of the current addition element III, in other words, a current flowing through the resistor $R_X$, becomes $2I_B$.

Since the quantities of the currents $I_A$ and $I_B$ are set to be $I_A \approx I_B$, the voltage drop $V_C$ of the resistor $R_X$ is substantially the same as in the foregoing case (i), and the same comparing operation as described above is conducted by the voltage comparator 6. As a result, the abnormality detection signal $V_1$ is obtained, the negative-feedback amplifiers 3 and 4 and the transistors $Q_1$ and $Q_2$ are turned off, and thus the current $I_L$ is interrupted.

(iii) In the case of simultaneous occurrence of grounding and a "short-circuit"

Since the transistor $Q_8$ is turned on in this case, the current $I_B$ is supplied from the transistors $Q_9$ and $Q_{10}$ to the current subtraction element I and the current addition element II. Meanwhile, the transistor $Q_5$ is turned on, and so it operates to draw in the current $I_A$ with regard to the current subtraction element I and the current addition element III.

The current $I_B$ supplied from the transistor $Q_9$ to the current subtraction element I is supplied to the collector of the transistor $Q_6$ through the respective emitter-collector of the transistors $Q_{12}$ and $Q_{13}k$. Since the transistor $Q_6$ is executing the operation of drawing in the current $I_A$ in the meantime and $I_A \approx I_B$, the transistor $Q_{11}$ turns off and the collector current of the transistor $Q_{11}$ becomes substantially zero. Since the current $I_B$ supplied to the emitter of the transistor $Q_{12}$ is drawn in by the transistor $Q_6$ as described above, the current flowing to the diodes $Q_{14}$ and $Q_{15}$ becomes substantially zero, and the transistor $Q_{16}$ is turned off. Accordingly, the current subtraction element I executes a subtraction $I_B - I_A \approx 0$, and thus the output current thereof becomes substantially zero.

Meanwhile, since the transistors $Q_5$ and $Q_8$ are on as described above, the current addition element III operates to draw in the current $I_A$ by the transistor $Q_{17}$ while operating to draw in the current $I_B$ by the transistor $Q_{18}$. The respective collector of the transistors $Q_{17}$ and $Q_{18}$ is connected in common to the current addition element III, and therefore the output current $I_C$ of the current addition element III, in other words, the current flowing through the resistor $R_X$, is in a quantity determined by $I_A + I_B$.

Since the currents $I_A$ and $I_B$ are set in the relationship of $I_A = I_B$, the voltage drop in the resistor $R_X$ becomes substantially the same as in the foregoing cases (i) and (ii). The same comparing operation as described above is conducted by the voltage comparator 6, and thus the abnormality detection signal $V_1$ is obtained. By the abnormality detection signal $V_1$, the negative-feedback amplifiers 3 and 4 and the transistors $Q_1$ and $Q_2$ are turned off, and thereby the current $I_L$ is interrupted.

The above-described detecting circuit has the following effects.

(1) The detection of an abnormality in the cases of the ground fault, the ground-power fault and the simultaneous occurrence of these faults can be performed without fail, and thereby the feeding of current can be interrupted when an abnormality occurs, since the circuit is provided with the current subtraction element I for effecting a subtraction of current on an absolute value basis based on the drawing-in of the supplied currents $I_B$ and $I_B$ corresponding to the ground condition, the "short-circuit" or the simultaneous occurrence of both faults, the current addition element II effecting the addition of said currents $I_A$ and $I_B$, the current addition element III adding up the output currents of said current subtraction element I and current addition element II, and the voltage comparator 6 comparing a voltage corresponding to the output current of said current addition element III with a reference voltage so as to obtain the abnormality detection signal $V_1$, and since it is designed so that the feeding to the feeders is interrupted by said abnormality detection signal when abnormality is detected.

(2) The function of a telephone set using the feeders can be improved by the effect described in the above (1).

While the present invention has been described herein on the basis of the preferred embodiment, it is a matter of course that the present invention is not limited to the above-described embodiment, but can be modified variously within a scope not transcending the purpose thereof.

For instance, an alarm may be given by lighting a pilot lamp, by operating a buzzer or by other means, while the current supply sources 14 and 15 are made non-operable by the abnormality detection signal $V_1$.

The above description is provided for the case wherein the present invention is applied mainly to the detection of an abnormality in the feeders for a telephone set. However, the invention is not limited to this field, but can be utilized extensively, e.g., for a communication circuit of an interphone and the like.

The present invention can be utilized extensively, at least, for an electronic telephone set.

What is claimed is:

1. A detecting circuit for detecting short-circuit and ground line conditions in a pair of feeders to be coupled to a telephone set, comprising:
    (1) first means for converting a voltage of one feeder of said pair of feeders into a first signal in response to a ground line condition of said one feeder; and
    (2) second means for converting a voltage of the other feeder of said pair of feeders into a second signal in response to a short-circuit condition of said other feeder.

2. A detecting circuit claimed as claim 1, wherein said first means is formed of a first comparator having inputs coupled to said one feeder and to ground, and said second means is formed of a second comparator having inputs coupled to said other feeder and a predetermined voltage.

3. A detecting circuit for detecting the respective electrical states of first and second lines forming a pair of feeders connected to a telephone set, comprising:
    (1) first means for adding a first signal representing a quantity of electricity of said first line and a second signal representing a quantity of electricity of said second line to produce an output representing the result of addition;
    (2) second means for subtracting said first signal representing a quantity of electricity of said first line and said second signal representing a quantity of electricity of said second line to produce an output representing the result of subtraction;
    (3) third means for adding the output of said first means and the output of said second means; and (4) fourth means for comparing an output of said third means to a predetermined reference value and for providing an output indicating whether either or both of said first and second lines is in a predetermined electrical state.

4. A detecting circuit as claimed in claim 3, further comprising:
first converting means for converting a voltage of said first line representing said quantity of electricity of said first line to a current forming said first signal; and
second converting means for converting a voltage of said second line representing said quantity of electricity of said second line to a current forming said second signal.

5. a detecting circuit as claimed in claim 4, wherein said first converting means is formed of a first current mirror circuit and a first resistor connected between the input of said first current mirror circuit and said first line, so that said first signal is obtained from the output of said first current mirror circuit, and wherein said second converting means is formed of a second current mirror circuit and a second resistor connected between the input of said second current mirror circuit and said second line, so that said second signal is obtained from the output of said second current mirror circuit.

6. A detecting circuit as claimed in claim 5, wherein said first current mirror circuit has a first output transistor and a second output transistor, said second current mirror circuit has a third output transistor and a fourth output transistor, said first means is connected to receive outputs from said second output transistor and said fourth output transistor, and said second means is connected to receive outputs from said first output transistor and said third output transistor.

7. A detecting circuit as claimed in claim 3, further comprising:
first controlling means coupled to said first line for setting the quantity of current in said first line at a predetermined value; and
second controlling means coupled to said second line for setting the quantity of current in said second line at a predetermined value;
wherein each of said first and second controlling means is coupled to receive the output of said fourth means, and wherein operations of said first controlling means and said second controlling means are controlled by the output of said fourth means so that the current of said first line and the current of said second line are reduced when either the quantity of electricity of said first line or the quantity of electricity of said second line deviates from a predetermined range.

8. A detecting circuit for detecting the electrical state of a pair of feeders connected to a telephone set, comprising:
(1) first converting means for converting the voltage of one of said pair of feeders to a first current signal;
(2) second converting means for converting the voltage of the other of said pair of feeders to a second current signal;
(3) first means for adding said first and second current signals of said first and second converting means;
(4) second means for subtracting said first and second current signals of said first and second converting means;

(5) third means for adding the output signals of said first means and said second means; and
(6) means for comparing an output of said third means to a predetermined reference value and for providing an output indicating whether either or both of said feeders is in a predetermined electrical state.

9. A system for detecting the electrical state of a pair of feeders connected to a telephone set, comprising:
a signal processing circuit including means for detecting and processing a quantity of electricity of one of said pair of feeders and a quantity of electricity of the other of said pair of feeders, means for effecting a first operation of subtraction and a second operation of addition of detection signals of said two quantities of electricity and means for effecting a third operation of addition of a subtraction signal and an addition signal obtained in said first and second operations, respectively, thereby producing an output signal indicating whether either or both of said pair of feeders is in a predetermined electrical state.

10. A circuit for detecting respective line faults in first and second lines to be coupled to a telephone set, comprising:
first means for converting a voltage on said first line into a first signal in response to a line fault of said first line;
second means for converting a voltage on said second line into a second signal in response to a line fault of said second line; and
means responsive to said first and second signals for providing an output indicating whether either or both of said first and second lines is in a line fault state.

11. A circuit for detecting respective line faults in first and second lines to be coupled to a telephone set, comprising:
first means coupled to said first line and responsive to a line fault in said first line for providing a first signal indicating that said first line is in a line fault state;
second means coupled to said second line and responsive to a line fault in said second line for providing a second signal indicating that said second line is in a line fault state;
setting means coupled to receive said first and second signals and responsive to at least one of said first and second signals for setting the electrical states of said first and second lines into predetermined electrical states so that the supply of a current to the telephone set is interrupted when said setting means receives either or both of said first and second signals.

12. In a telephone communication system comprising:
a telephone set;
first and second lines coupled to said telephone set; and
an integrated circuit coupled to said first and second lines for supplying a current to said telephone set, said integrated circuit further including a detecting circuit for detecting the respective electrical states of said first and second lines, said detecting circuit comprising:
(a) first converting means for converting the voltage of said first line to a first current signal;
(b) second converting means for converting the voltage of said second line to a second current signal;

(c) first means for adding said first and second current signals of said first and second converting means;
(d) second means for subtracting said first and second current signals of said first and second converting means;
(e) third means for adding the output signals of said first means and said second means; and
(f) means for comparing an output of said third means to a predetermined reference value and for providing an output indicating whether either or both of said first and second lines is in a predetermined electrical state.

13. In a telephone communication system comprising:
a telephone set;
first and second lines coupled to said telephone set; and
an integrated circuit coupled to said first and second lines for supplying a current to said telephone set, said integrated circuit further including a detecting circuit for detecting short-circuit and ground line conditions of said first and second lines, said detecting circuit comprising;
(a) first means for converting a voltage on said first line into a first signal in response to a ground line condition of said first line;
(b) second means for converting a voltage on said second line into a second signal in response to a short-circuit condition of said second line; and
(c) means responsive to either or both of said first and second signals for providing an output indicating whether either or both of said first and second lines is in a predetermined electrical condition.

14. In a telephone communication system according to claim 13, wherein said first means is formed of a first comparator having inputs coupled to said first line and to ground, and said second means is formed of a second comparator having inputs coupled to said second line and a predetermined voltage.

* * * * *